US005751475A

United States Patent [19]
Ishiwata et al.

[11] Patent Number: 5,751,475
[45] Date of Patent: May 12, 1998

[54] PHASE CONTRAST MICROSCOPE

[75] Inventors: Hiroshi Ishiwata, Yokosuka; Chikara Nagano, Hachioji, both of Japan

[73] Assignee: Olympus Optical Co., Ltd., Tokyo, Japan

[21] Appl. No.: 357,317

[22] Filed: Dec. 16, 1994

[30] Foreign Application Priority Data

Dec. 17, 1993 [JP] Japan ................................. 5-318421
Mar. 16, 1994 [JP] Japan ................................. 6-045697
Mar. 24, 1994 [JP] Japan ................................. 6-053819

[51] Int. Cl.$^6$ ................................. G02B 21/06
[52] U.S. Cl. .................... 359/387; 359/371; 359/386
[58] Field of Search ..................... 359/368–371,
359/385–389, 36, 47, 48, 54, 55, 80, 84,
85, 87, 94, 96, 558–564

[56] References Cited

U.S. PATENT DOCUMENTS

| | | | |
|---|---|---|---|
| 4,561,731 | 12/1985 | Kley | 359/385 |
| 4,833,314 | 5/1989 | Pepper et al. | 359/370 |
| 4,873,653 | 10/1989 | Grosskpf | 359/371 |
| 5,111,515 | 5/1992 | Javidi | 359/559 |
| 5,150,229 | 9/1992 | Takesue et al. | 359/559 |
| 5,420,717 | 5/1995 | Tabata | 359/371 |
| 5,572,359 | 11/1996 | Otaki et al. | 359/371 |

FOREIGN PATENT DOCUMENTS

| | | |
|---|---|---|
| 27-2523 | of 1952 | Japan . |
| 56-12615A | 2/1981 | Japan . |
| 38-1129B2 | 1/1983 | Japan . |
| 58-184115 | 10/1983 | Japan . |
| 289015 | 3/1990 | Japan . |

OTHER PUBLICATIONS

"Microscope attachment for improved visibility of weak phase objects" Courtens et al, IBM Technical Disclosure Bull., vol. 22, No. 11, Apr. 1980. p. 5085.

"Detectivity limit of very small objects by video–enhanced microscopy" Mizushima, Applied Optics, vol. 27, No. 12, Jun. 15, 1988, pp. 2587–2594.

Yamamoto, et al. "Some Improvements in the Phase Contrast Microscope", Journal of Microscopy, vol. 129, Pt. 1, Jan. 1983, pp. 49–62.

Ooki, "Theoretical Considerations on Phase Contrast Imaging", Optics, vol. 20, No. 9, Sep. 1991, pp. 590–594.

Takahashi, et al, "Inverse Problem in Microscopy", Technical Research Report of the Electrical and Communication Society of Japan, MBE 88–58, 1988, pp. 35–42.

Kadono, et al, "Application of Liquid Crystal Phase Modulator to Phase–shifting Interferometry", Preliminary Thesis of Applied Physics Society of Japan, Spring 1991, 2p–B–11.

*Primary Examiner*—Thong Nguyen
*Attorney, Agent, or Firm*—Watson Cole Stevens Davis, P.L.L.C.

[57] ABSTRACT

A phase contrast microscope including an illuminating optical system, a ring slit arranged at a pupil of the illuminating optical system, an imaging optical system, and a phase plate arranged at a pupil of the imaging optical system which is conjugate with the pupil of the illuminating optical system with respect to a specimen plane on which a specimen under inspection is placed. The phase plate is formed by a liquid crystal and a pair of transparent ring-shaped electrodes arranged on both sides of the liquid crystal. A voltage applied across the liquid crystal via the electrodes is changed such that a phase difference introduced by the phase plate is set to $\pm\pi/2$ to obtain a dark contrast image and a bright contrast image. A difference between these dark and bright contrast images is derived to obtain a phase contrast image having high contrast and resolution.

21 Claims, 9 Drawing Sheets

FIG_2A
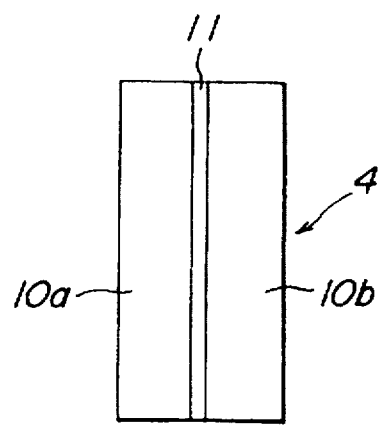
FIG_2B
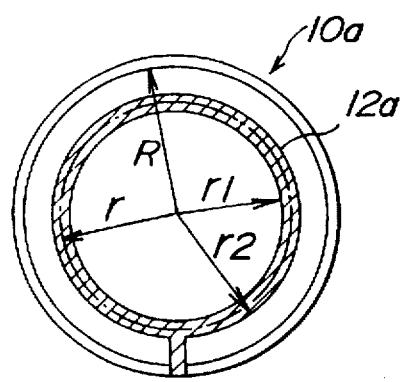
FIG_2C
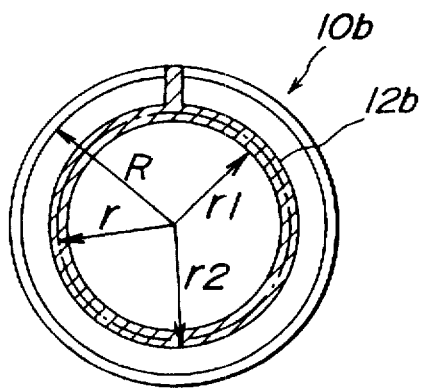

FIG_6
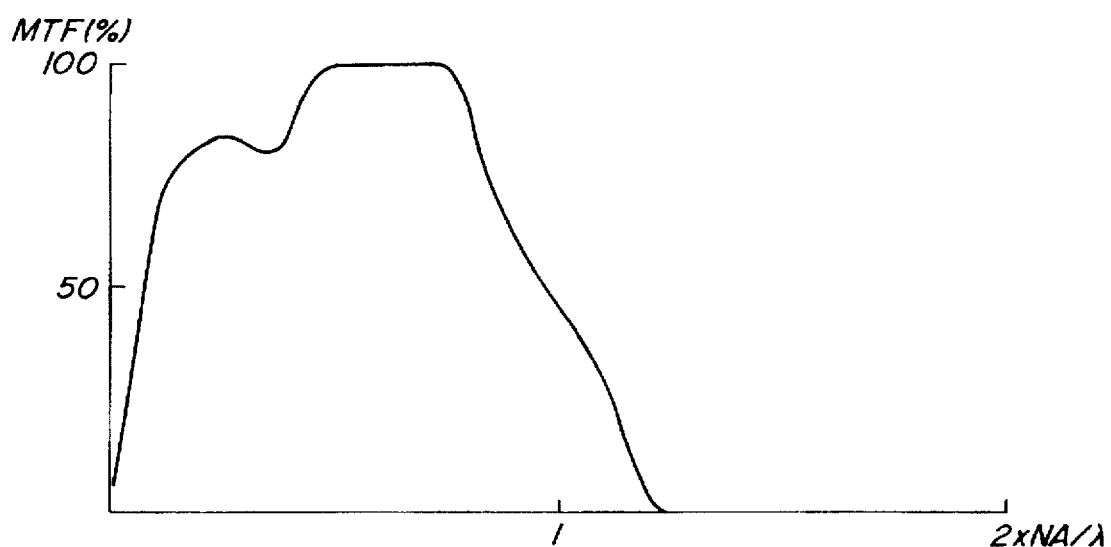
FIG_7

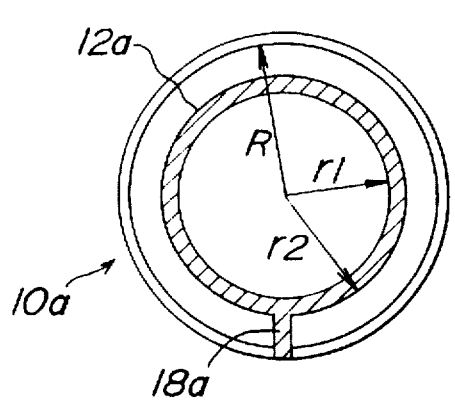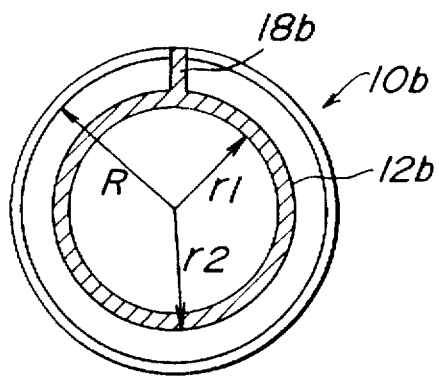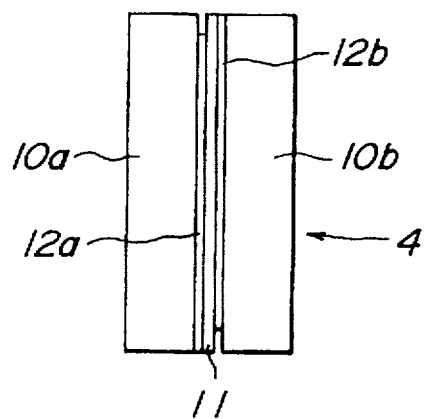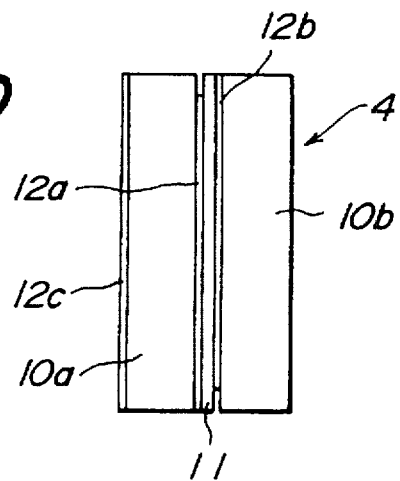

FIG._12A
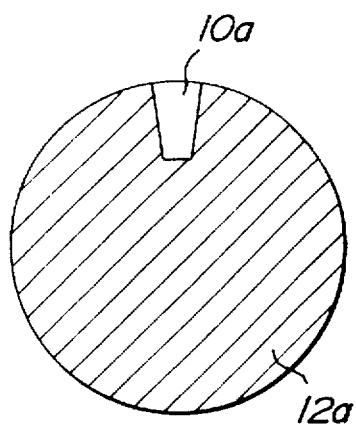
FIG._12B
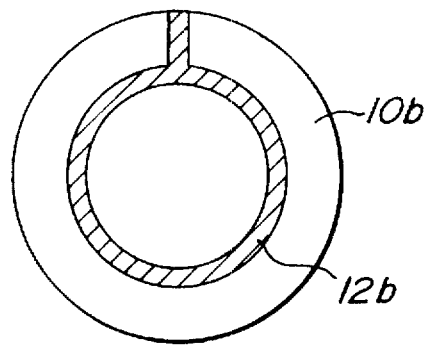
FIG._12C
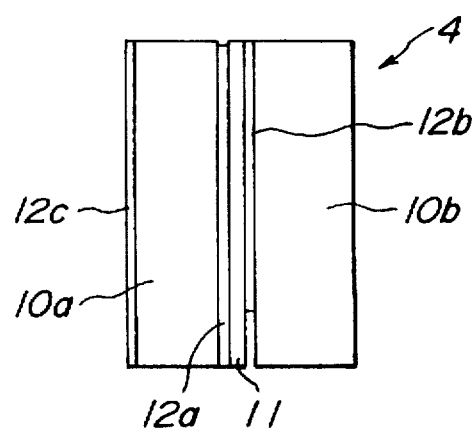

PHASE CONTRAST MICROSCOPE

BACKGROUND OF THE INVENTION

1. Field of the Invention

The present invention relates to a phase contrast microscope for inspecting transparent specimens such as living tissues and bacteria.

In general, the phase contrast microscope comprises an illumination optical system for illuminating a specimen under inspection, a ring slit arranged at a pupil of said illumination optical system, an imaging optical system for forming an image of the specimen, and a phase ring arranged at a pupil of said imaging optical system, said pupil of the imaging optical system being conjugate with the ring slit with respect to a specimen plane on which said specimen situates In the phase contrast microscope, illumination light is diffracted by a specimen plane, and phase and intensity of a zero order diffracted beam are changed. Then, the zero order beam interferes higher order diffracted beams, and an amount of a phase difference introduced by the specimen is converted into a contrast of an image.

In "Some improvement in the phase contrast microscope". K. Yamamoto and A. Taira, Journal of Microscopy, 129 (1983), pp. 49–62, there has been proposed one method for improving a contrast of the phase contrast image obtained by the phase contrast microscope. In this method, a contrast of image is improved by setting a diameter of a phase ring to about a half of a diameter of a pupil of an objective lens in the imaging optical system.

However, in the phase contrast microscope, a cut-off frequency is determined by a ratio between a diameter of the phase ring and a diameter of the pupil of the objective lens as described in "Theoretical Considerations on Phase Contrast Imaging", Optics, Hiroshi Ooki, Vol. 20, No. 9 (September 1991), pp. 590(44)–594(48). Therefore, the phase contrast microscope has a low resolution in comparison with an ordinary bright field microscope. In order to mitigate such a demerit, it is necessary to bring said ratio of a diameter of the phase ring to a diameter of the pupil of the objective lens to 1 as close as possible. However, then a contrast at a low spatial frequency range is decreased as described in said publication, so that a contrast of a whole image would be reduced and a clear image could not be inspected.

In order to increase a contrast of the phase contrast image without changing a position of the phase ring, an absorbance by the phase ring may be increased. However, if the absorption of the phase ring is increased, it is no more possible to reproduce an accurate phase contrast image due to an influence of spatial frequency components (non-linear components) which are not actually existent in a specimen if the specimen has a large thickness comparable to a wavelength of the light beam. Usually, biological specimens have large thicknesses, and thus this solution could not be effectively applied.

As stated above, in the known phase contrast microscopes, it is very difficult to satisfy simultaneously both requirements for obtaining a phase contrast image having high resolution and high contrast.

In the phase contrast microscope, when the phase ring is constructed to provide a phase difference of $+\pi/2$ between a zero order diffracted beam and higher order diffracted beams, a dark contrast image can be inspected, and when a phase difference of $-\pi/2$ is given, a bright contrast image is observed. To this end, it is necessary to replace mechanically phase rings alone or together with objective lenses. Then, in order to match pupil positions of the ring slit and phase rings with each other, it is necessary to adjust the position of the ring slit and/or phase ring. However, it is quite difficult to match said positions precisely and there are produced mechanical errors, so that the dark and bright contrast images could not be observed under the same condition.

Moreover, in Japanese Patent Application Publication No. 27-2523, there is proposed a method of adjusting a contrast of phase contrast image by changing a phase difference and transmissivity at a phase ring. To this end, a polarizing plate is combined with a phase ring, and the polarizing plate is rotated. However, in this method, the transmissivity of the whole optical system is fluctuates and an eccentricity of the optical system is produced due to the rotation of the polarizing plate, and therefore the observating condition could not be maintained constant.

SUMMARY OF THE INVENTION

The present invention has for its object to provide a novel and useful phase contrast microscope, in which the resolution can be effectively improved without decreasing the contrast of the image.

It is another object of the invention to provide a phase contrast microscope, in which various kinds of inspection modes can be selected easily under the same condition without causing mechanical errors.

According to a first aspect of the invention, a phase contrast microscope comprises:

an illumination optical system for illuminating a specimen under inspection;

an aperture arranged at a pupil of said illumination optical system and having an arbitrary shape;

an imaging optical system for forming an image of the specimen;

a phase plate arranged at a pupil of said imaging optical system, said pupil of the imaging optical system being arranged at a conjugate position with said aperture with respect to a specimen plane on which said specimen situates and having a shape which is similar to that of said aperture;

an image pick-up means provided at an imaging plane on which an image of the specimen is formed by said imaging optical system for picking-up the image to produce an image signal;

a storing means for storing said image signal derived by said imaging means;

a signal processing means for processing the image signal read out of said storing means; whereby said phase plate is constructed to give phase differences which have substantially same amounts but have opposite signs, images at said different phase differences are separately picked-up by said image pick-up means and stored in said storing means, and an image of a difference between said two images is derived as a phase contrast image.

In a preferable embodiment of the phase contrast microscope according to the invention, said phase plate is formed by a liquid crystal and substantially transparent electrodes provided on opposite sides of the liquid crystal, and a voltage applied to the liquid crystal device is changed such that said phase differences having substantially the same amount but having opposite signs are obtained.

Further, in order to improve the resolution without deteriorating the contrast, it is preferable to construct the phase plate to have a ring-shaped band, and a ratio of a radius r of a center of the ring-shaped band to a radius R of the pupil of the imaging optical system is set to 1>r/R>0.5.

In order to convert a phase distribution of the specimen having a gradual phase change (lower spatial frequency) into a contrast accurately without decreasing the contrast and enhancing a special spatial frequency range, it is preferable to provide an operating means for effecting a deconvolution for the difference image obtained by the signal processing means.

Moreover, said deconvolution operation is performed by performing Fourier transform for difference signal derived by said signal processing means, dividing a value thereof by an optical transfer function, and finally performing Fourier transform.

According to a second aspect of the invention, a phase contrast microscope comprises:

an illumination optical system for illuminating a specimen under inspection;

a ring slit arranged at a pupil of said illumination optical system;

an imaging optical system for forming an image of the specimen;

a phase ring arranged at a pupil of said imaging optical system, said pupil of the imaging optical system being arranged at a conjugate position with respect to a specimen plane on which said specimen situates, said phase ring including an element which introduces an electrically variable phase difference between a zero order diffracted beam and higher order diffracted beams, and substantially transparent electrodes arranged on opposite sides of said element such that a voltage is applied across the element via the electrodes; and a controlling means for adjusting a value of said voltage applied across said element.

In a preferable embodiment of the phase contrast microscope according to the second aspect of the invention, at least one transparent electrode of the phase ring has a ring shape similar to that of the ring slit. Moreover, said element may be advantageously formed by a liquid crystal.

In another preferable embodiment of the phase contrast microscope according to the invention, said controlling means is constructed to set said voltage such that a dark contrast image, a bright contrast image and a high resolution image can be selectively obtained.

BRIEF DESCRIPTION OF THE DRAWINGS

FIGS. 2A, 2B and 2C are side and plan views illustrating a phase plate shown in FIG. 1;

FIGS. 4, 5, 6 and 7 are graphs of transfer functions of several embodiments of the phase contrast microscope according to the invention;

FIGS. 9A, 9B and 9C are plan and side views of a phase plate shown in FIG. 8;

FIG. 10 is a side view depicting another embodiment of the phase plate according to the invention;

FIGS. 12A, 12B and 12C are plan and side views showing another embodiment of the phase plate according to the invention.

Figure 1:
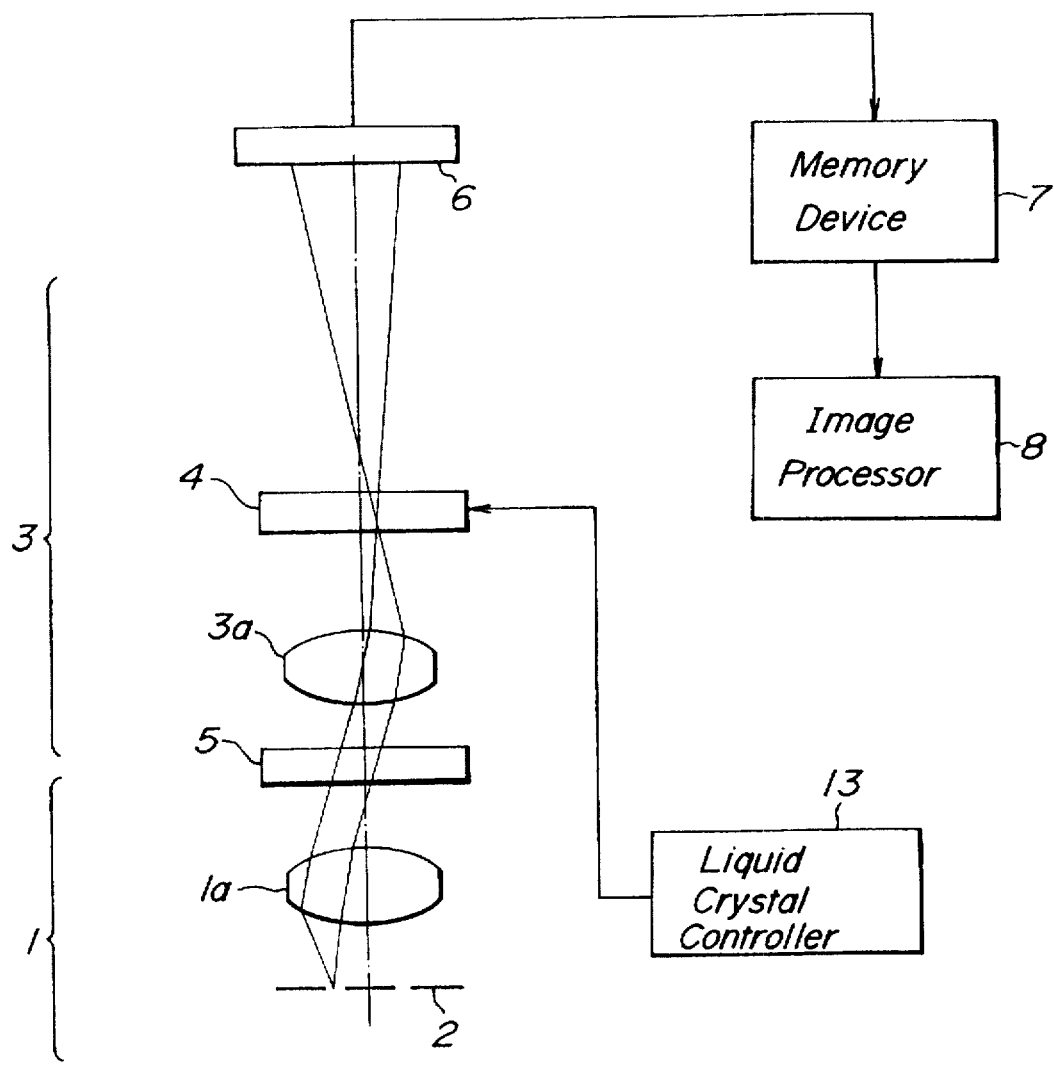
FIG. 1 is a schematic view showing an embodiment of the phase contrast microscope according to the invention.

Now an imaging theory in the phase contrast microscope will be explained with reference to a linear model.

It is first assumed that a pupil function of the imaging optical system is represented by $P(\xi)$, a pupil function of the illuminating optical system is denoted by $Q(\xi)$ and a phase distribution of a phase object (specimen) is expressed by $\phi(x)$. Then, an intensity distribution I(x) of the phase object may be represented as follows by performing a weak-phase approximation:

$$I(x) = R(0,0) + i\int\{R(f,0) - R(0,-f)\Phi(f)\exp(-ifx)\}df + \iint \Phi(f)\Phi(-f)R(f,f')\exp-(f-f')x\,dfdf' \quad (1)$$

$$R(f,f') = \int Q(\xi)P(\xi+f)P(\xi+f')d\xi$$

wherein $\Phi(f)$ is a Fourier transform of the phase distribution of the specimen $\phi(x)$ and f is a spatial frequency.

The pupil function $P(\xi)$ of the imaging optical system may be expressed by a linear combination of the following components:

$$Pa(\xi) = \begin{cases} 1(NA_o \leq |\xi| < NA) \\ 0(NA_i \leq |\xi| < NA_o) \\ 1(|\xi| < NA_i) \end{cases} \quad (2)$$

$$Pb(\xi) = \begin{cases} 0(NA_o \leq |\xi| < NA) \\ 1(NA_i \leq |\xi| < NA_o) \\ 0(|\xi| < NA_i) \end{cases}$$

$$P(\xi) = Pa(\xi) + A \cdot Pb(\xi)$$

wherein $A=C \exp(-i\theta)$, C: amplitude transmittance $0<C\leq 1$, and $\theta$: amount of phase difference introduced by the phase plate.

When the pupil function $Q(\xi)$ of the illuminating optical system may be assumed to be equal to $Pb(\xi)$, the above equation (1) may be rewritten as follows:

$$I(x)=DC\{1-\int F(f)\Phi(f)\exp(-ifx)df\}+\iint\Phi(f)\Phi(-f)R(f,f')\exp\{-(f-f')x\}dfdf' \quad (3)$$

wherein $DC=C^2\int Pb(\xi)d\xi$ $$F(f)=2C\sin\theta\int Pb(\xi)Pa(\xi+f)d\xi/DC \quad (4)$$

Therefore, the contrast of the image obtained by the phase contrast microscope may be represented substantially in accordance with the equation (3).

In the above equation (4), $\theta$ expresses an amount of phase difference which is given by the phase plate between the zero order diffracted beam and the higher order diffracted beams. This amount $\theta$ of phase difference is generally set to $\pm\pi/2$. In the case of $+\pi/2$, a so-called dark contrast is obtained and in the case of $-\pi/2$, a bright contrast is attained. Now it is further assumed that intensity distributions for the dark and bright contrasts are denoted by Ia and Ib, respectively. Then, a difference Ia−Ib between these intensity distributions may be represented as follows:

$$Ib-Ia=DC\{2\int F(f)\Phi(f)\exp(-ifx)df\} \quad (5)$$

This equation (5) shows that only the intensity distribution for the phase contrast image is increased by two times.

Therefore, according to the invention, the dark and bright contrast images are picked-up by setting the phase difference between the zero order diffracted light beam and the higher order diffracted light beams to $\pm\theta=\pi/2$, and these image are stored in the storing means. Then, a difference between the dark and bright contrast images is derived by suitably processing the image signals read out of the storing means. In this manner, it is possible to attain the phase contrast image having an intensity distribution increased by two times as represented by the equation (5). In this phase contrast image, the non-linear terms which are contained in the equation (3) have been cancelled out, so that an influence of the non-linear terms can be mitigated and the phase contrast image can be obtained accurately.

The above mentioned two images for $\theta=\pm\pi/2$ may be obtained by selectively inserting two phase plates into the pupil of the imaging optical system. However, in this case, optical axes of these phase plates may be deviated from each other and it would be impossible to make an image of the aperture having an arbitrary shape coincided completely with respective phase plates. In this manner, it is quite difficult to obtain the dark and bright contrast images under the same condition.

In a preferable embodiment of the phase contrast microscope according to the invention, the phase plate is composed of a liquid crystal and a voltage applied across the liquid crystal is adjusted such that the above mentioned phase differences of $\pm\pi/2$ can be realized accurately without causing mechanical errors. Then, the dark and bright contrast images can be obtained under the same condition, so that a more accurate phase contrast image can be obtained.

From the above equation (4), it is understood that the cut-off frequency of the spatial frequency characteristic of the phase contrast microscope is increased and thus the resolution is improved by bringing the ratio of a radius r of the phase plate to a radius R of the pupil of the imaging optical system close to 1. In the present invention, since the difference between the dark contrast image and the bright contrast image is derived as the final phase contrast image, the contrast of the phase contrast image is increased by two times without decreasing the resolution. Therefore, according to the invention, it is further preferable to satisfy the following equation (6):

$$r/R \geq 0.5 \qquad (6)$$

When the ratio r/R is set to 1 (r/R=1), it is impossible to give any phase difference between the zero order diffracted beam and the higher order diffracted beams so that the phase contrast microscopy is not realized. Therefore, the ratio r/R should be smaller than 1. Further, when the ratio becomes smaller than 0.5, it is no more impossible to attain a desired resolution.

When the above equation (5) is Fourier transformed, the following equation is obtained:

$$\int (Ib-Ia)\exp(ifx)df = 2DC \cdot F(f) \cdot \Phi(f) \qquad (7)$$

Then, this equation (7) is divided by $2DC \cdot F(f)$, and a quotient of this division is Fourier transformed to obtain the following equation:

$$\phi(x) = \int \{\int (Ib-Ia)\exp(ifx)df/2DC \cdot F(f)\}\exp(-ifx)df \qquad (8)$$

A term F(f) in this equation (8) may be expressed by the following equation under $\theta=\pm\pi/2$:

$$F(f)=\pm 2C\int Pb(\xi)Pa(\xi+f)d\xi/DC$$

In this manner, it is possible to attain the Fourier transform F(f) from the pupil functions of the illuminating optical system and imaging optical system. It should be noted that even if $\theta$ is arbitrary, F(f) may be derived from the equation (4).

In the above explanation, it has been assumed that a shape of the aperture provided at the pupil of the illuminating optical system is identical with a shape of the phase plate arranged at the pupil of the imaging optical system. However, when the aperture has a shape expressed by the following equation, $$Q(\xi) = \begin{cases} 1(NA_{o'} \leq |\xi| < NA) \\ 0(NA_i \leq |\xi| < NA_{o'}) \\ 1(|\xi| < NA_i) \end{cases} \qquad (9)$$

Then, F(f) may be obtained in accordance with the following equation:

$$F(f)=2C\sin\theta\int Q(\xi)Pa(\xi+f)d\xi/DC \qquad (10)$$

That is, F(f) may be obtained from a shape of the aperture, a shape and a transmittance of the phase plate, and an amount of phase difference introduced by the phase plate.

Therefore, according to the invention, the first phase contrast image for $0<\theta$ is stored in the storing means and the second phase contrast image for $\theta<0$ is stored in the storing means, and then a difference between these first and second phase contrast images is derived by suitably processing the first and second phase contrast images by the signal processing means. Finally the thus derived contrast image is subjected to a deconvolution in accordance the F(f) which is obtained from a shape of the aperture, a shape and a transmittance of the phase plate, and an amount of phase difference produced by the phase plate, it is possible to convert a phase distribution of a specimen under inspection into a contrast in a correct manner.

It should be noted that the function of the aperture provided at the pupil of the illuminating optical system and the phase plate arranged at the pupil of the imaging optical system is to change phase and intensity of the zero order diffracted beam such that it interferes the higher order diffracted beams. Therefore, the aperture may be shaped as an arbitrary shape instead of the ordinary ring shape. Similarly, the phase plate may be formed into an arbitrary shape accordingly.

DESCRIPTION OF THE PREFERRED EMBODIMENTS

FIG. 1 is a schematic view showing an embodiment of the phase contrast microscope according to the invention. The microscope comprises an illuminating optical system 1 including a condenser lens 1a and a ring slit 2 provided at a pupil of the illuminating optical system 1. It should be noted that according to the invention, the ring slit 2 may be replaced by an aperture having any desired shape. The microscope further comprises an imaging optical system 3 including an objective lens 3a and a phase plate 4. The phase plate 4 is arranged at a pupil of the imaging optical system 3 which is conjugate with the position of the ring slit 2 with respect to a specimen plane on which a specimen 5 is placed. In the present embodiment, the phase plate 4 is formed by a phase ring having a similar shape to the shape of said ring slit 2. In this manner, it is possible to form a phase image of the specimen 5 in accordance with the phase contrast method. In the present embodiment, the phase plate 4 is arranged at the pupil of the imaging optical system, but according to the invention, the phase plate may be arranged near the pupil of the imaging optical system.

In the present embodiment, the phase contrast image formed by the imaging optical system 3 is picked-up by an electronic image sensor 6 to derive an image signal. The thus derived image signal is stored in a memory device 7 and the image signal read out of the image device 7 is processed by an image processor 8 to obtain a final phase contrast image having high contrast and resolution.

As shown in FIG. 2A, the phase ring 4 is constructed by two plane parallel glass plates 10a and 10b and a liquid crystal 11 interposed between the plates. On inner surfaces of the plane parallel plates 10a and 10b there are provided ring shaped transparent electrodes 12a and 12b by coating a transparent conductive material. An absorption film may be applied on both or one of the electrodes. When the absorption film is applied only on one of the electrodes 12a or 12b, its absorbance is set to about 10 to 15% and when absorption films are applied on both the electrodes, a total absorbance is set to about 10 to 15%. In order to satisfy requirements of resolution and contrast of the phase image, the phase ring 4 is preferably constructed such that a condition of r/R≧0.5 is fulfilled, wherein r is a radius of a center circle of the annular ring electrodes and R is a radius of the pupil of the imaging optical system 3. In the present embodiment, an inner radius r1 and an outer radius r2 of the transparent electrodes 12a, 12b are set to 0.7R and 0.8R, respectively.

The transparent electrodes 12a and 12b of the phase ring 4 are connected to a liquid crystal controller 13 and a voltage applied across the liquid crystal 11 via the electrodes 12a and 12b is controlled such that light transmitted through the transparent electrodes 12a and 12b is subjected to optical path-differences of ±π/2 with respect to light passing through a remaining portion of the phase ring 4.

If a cut-off frequency of the electronic image sensor 6 is lower than that of the imaging optical system 3, the resolution of the phase image is decreased even though the resolution of the imaging optical system 3 is increased. Therefore, it is preferable to satisfy a condition of λ/NA≧2u, wherein λ is a wavelength of the illuminating light, NA is a light flux which is made incident upon the electronic image sensor 6, and u is a size of a single pixel of the electronic image sensor.

In this manner, in the present embodiment, by controlling the voltage applied across the liquid crystal 11 by means of the liquid crystal controller 13 such that the optical path-differences of +π/2 and −π/2 can be successively obtained, the electronic image sensor 6 can pick-up images under dark contrast and bright contrast conditions, successively to derive two image signals. These image signals are stored in the memory device 7, and then a difference between these image signals is derived by the image processor 8 to obtain a phase contrast image having a contrast which is higher than that of the known phase contrast microscope by two times, while the resolution is also high as compared with that of the known phase contrast microscope.

Figure 3:
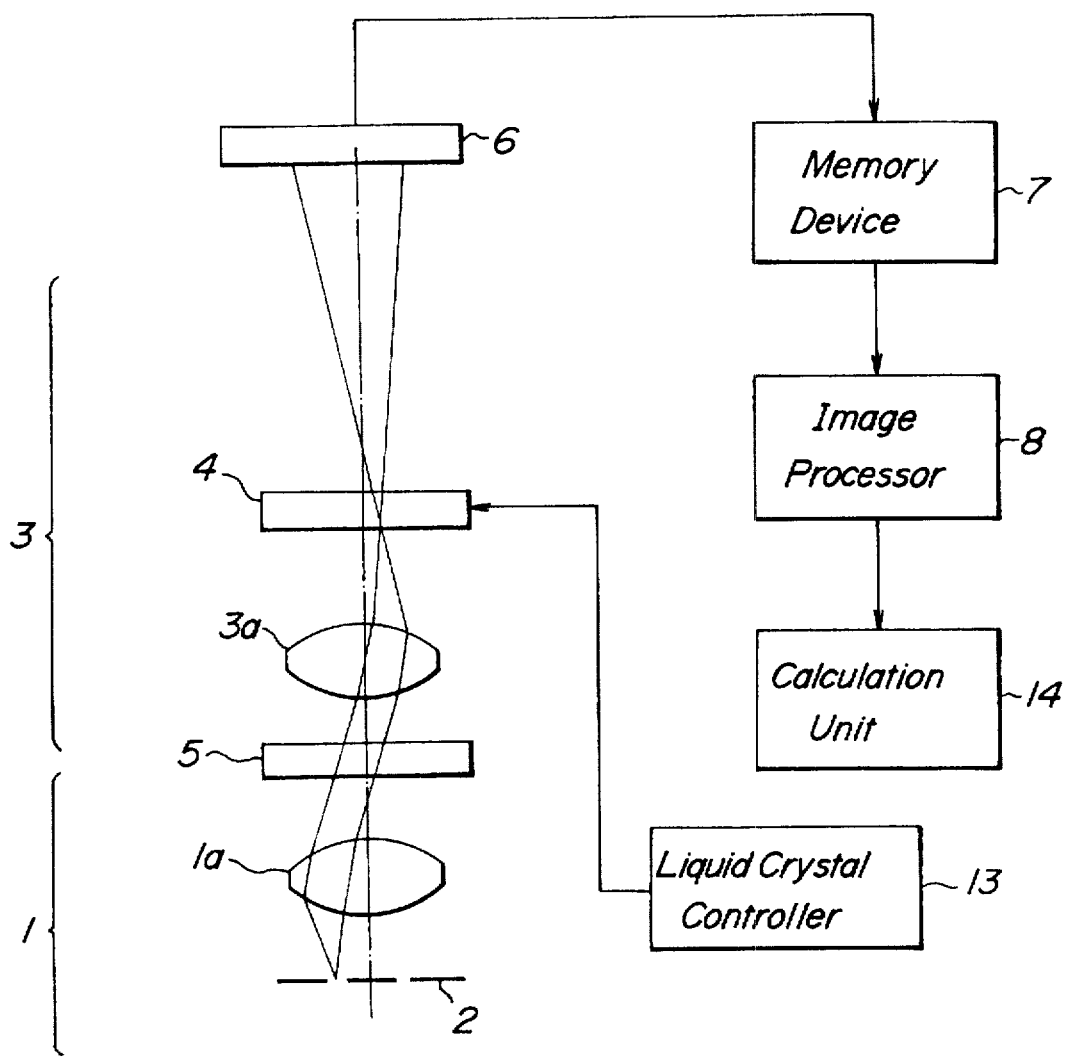
FIG. 3 is a schematic view depicting another embodiment of the phase contrast microscope according to the invention.

FIG. 3 is a schematic view illustrating a second embodiment of the phase contrast microscope according to the invention. In the present embodiment, the image signal obtained by the image processor 8 is supplied to a calculating unit 14. As explained above, the first phase contrast image under the dark contrast (π/2) and the second phase contrast image under the bright contrast (−π/2) are successively stored in the memory device 7. Then, corresponding pixels of these phase contrast images are successively read out of the memory device 7 into the image processor 8 and differences between corresponding pixels are derived. In this manner, it is possible to derive a difference image from which bright field components of a background and non-linear components can be cancelled out. The thus obtained difference image signal is then supplied to the calculating unit 14.

In the calculating unit 14, a deconvolution operation is carried out for the difference image signal supplied from the image processor 8. To this end, the difference image signal is sampled with a size of a single pixel to perform a Fourier transform, and then Fourier transformed values are divided by an optical transfer function. Further, the thus obtained quotients are subjected to the Fourier transform again.

Now, it is assumed that the shape of the ring slit 2 corresponds to the shape of the phase ring 4. Then, the pupils of the illuminating optical system 1 and imaging optical system 3 are expanded two-dimensionally and the following equation is calculated in accordance with the inner and outer radii r1=0.7R and r2=0.8R of the transparent electrodes 12a and 12b of the phase ring 4:

$$F(f)=2C\sin\theta\int Q(\xi)Pa(\xi+f)d\xi/DC \qquad (11)$$

Figure 4:
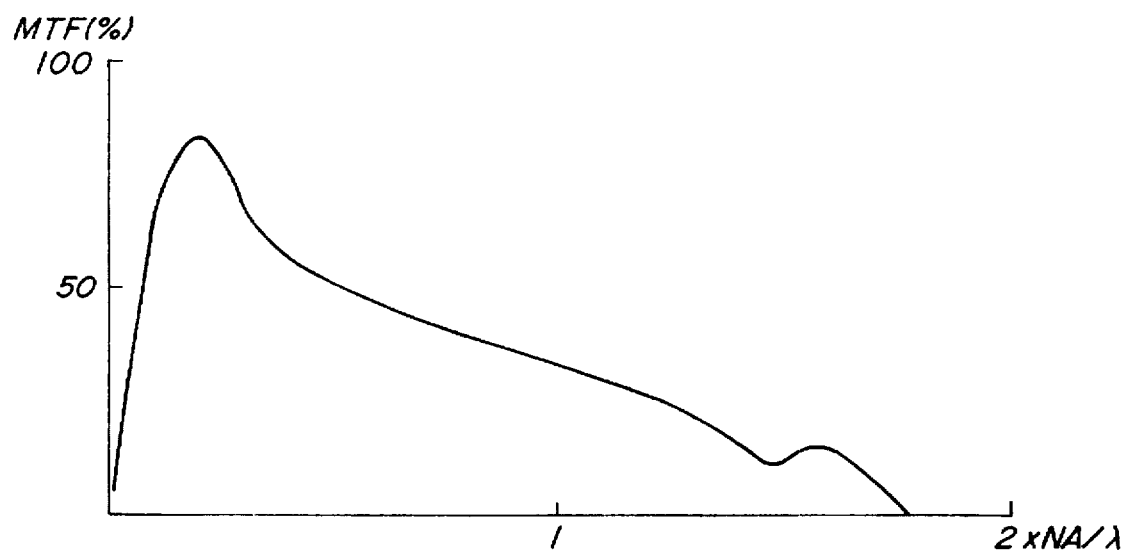

In this manner, a modulation transfer function MTF shown in FIG. 4 is obtained. In FIG. 4, a horizontal axis denotes a value which is obtained by normalizing a radius of the pupil of the imaging optical system 3 with a unit value of 1. This value has a dimension of NA/λ, wherein NA is a numerical aperture of the imaging optical system 3 and λ is a wavelength of light emitted by a light source. A vertical axis represents MTF which is obtained by normalizing the above equation (10) by the following equation:

$$\int Pb(\xi)Pa(\xi+f)d\xi \qquad (12)$$

Therefore, the curve shown in FIG. 4 represents a transfer function of the optical system including the above mentioned ring slit 2 and phase ring 4. By using this transfer function, the deconvolution is carried out for the difference image derived from the image processor 7, and a phase distribution of the specimen 5 can be accurately obtained although the specimen does not show a sharp phase change and has a low spatial frequency. When the phase distribution is expressed by contrast, the phase distribution can be represented in the term of contrast by the deconvolution without decreasing a contrast and particularly a contrast of the phase distribution of a specific spatial frequency range.

Figure 5:
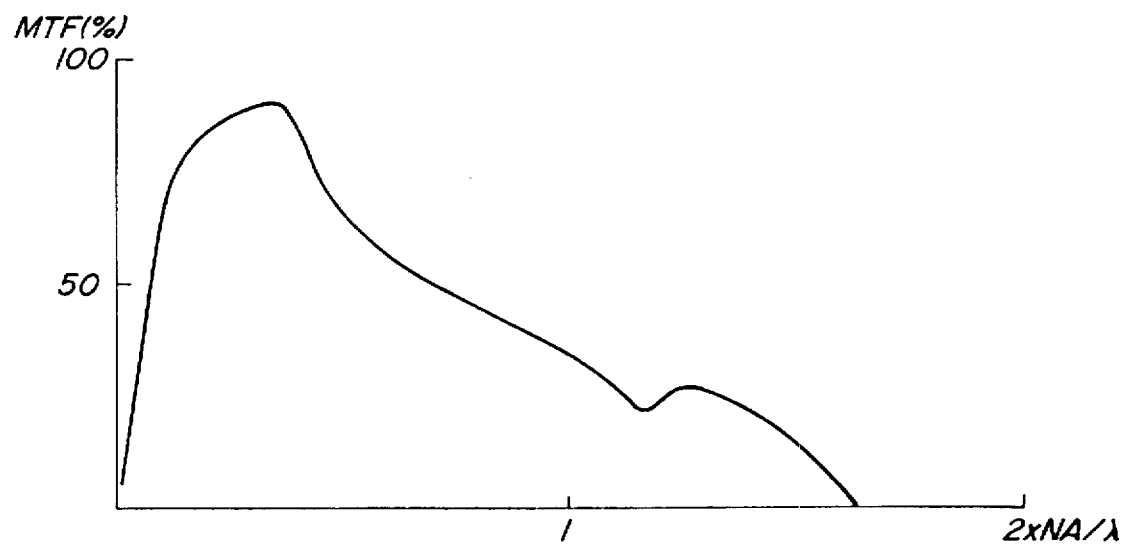

In a third embodiment of the phase contrast microscope according to the invention, the inner and outer radii r1 and r2 of the ring-shaped transparent electrodes 12a and 12b of the phase ring 4 shown in FIG. 3 are set to r1=0.55R and r2=0.65R. Then, the transfer function of the optical system is shown in FIG. 5. The difference image obtained by deriving a difference between the dark contrast image and the bright contrast image is subjected to the deconvolution by using the transfer function shown in FIG. 5. Therefore, also in the present embodiment, the phase distribution of the specimen can be detected accurately.

In a fourth embodiment of the phase contrast microscope according to the invention, one of the two transparent electrodes 12a and 12b (see FIG. 2) is not formed as the annular ring, but is constructed as a full face transparent electrode and the inner and outer radii r1 and r2 of the other ring-shaped transparent electrode of the phase ring 4 are set to r1=0.15R and r2=0.25R. Then, the transfer function of the optical system is shown in FIG. 6. The difference image obtained by deriving a difference between the dark contrast image and the bright contrast image is subjected to the deconvolution by using the transfer function shown in FIG. 6. Therefore, also in the present embodiment, the phase distribution of the specimen can be detected accurately.

In a fifth embodiment of the phase contrast microscope according to the invention, the inner and outer radii r1 and r2 of the ring-shaped transparent electrodes 12a and 12b of the phase ring 4 shown in FIG. 3 are set to r1=0.87R and r2=0.928R. Then, the transfer function of the optical system is shown in FIG. 7. The difference image obtained by deriving a difference between the dark contrast image and the bright contrast image is subjected to the deconvolution operation by using the transfer function shown in FIG. 7. Also in the present embodiment, the phase distribution of the specimen can be obtained precisely. Particularly, a cut-off frequency of the transfer function extends substantially to a cut-off frequency of the usual bright field optical system, so that the phase distribution of the specimen can be detected much more accurately.

Figure 8:
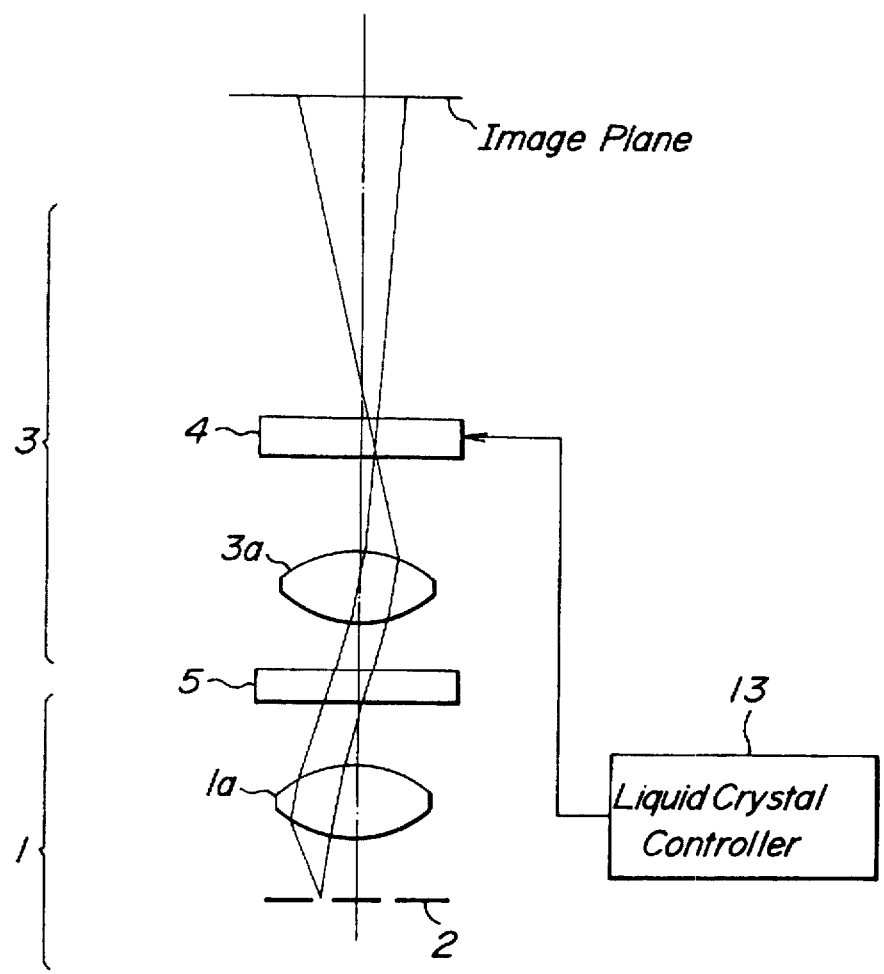
FIG. 8 is a schematic view showing another embodiment of the phase contrast microscope according to the invention.

FIG. 8 is a schematic view showing a sixth embodiment of the phase contrast microscope according to the invention. The basic construction of the present embodiment is the same as that of the previous embodiment, and similar elements are denoted by the same reference numerals used in the previous embodiments and their detailed explanation is dispensed with. In the present embodiment, the phase contrast image formed at a focal plane of the objective lens system 3 is inspected.

The phase ring 4 is formed by the liquid crystal. It has been known that an amount of phase shift introduced by the liquid crystal is changed in accordance with a voltage applied across the liquid crystal by means of the electrodes. For instance, refer to "Application of Liquid Crystal Phase Modulation Element to Phase Shift Interferometer", H. Kadono, M. Konan. R. Toyooka, Preliminary Theses for 37th Meeting of Applied Physics Society Japan, 1990 30a-C-4. By suitably adjusting an applied voltage, a phase difference between a light beam transmitted through the electrode portion and a light beam transmitted through a non-electrode portion can be suitably changed.

FIGS. 9A, 9B and 9C illustrate the phase ring 4 of the present embodiment. A liquid crystal 11 is sandwitched between parallel glass plates 10a and 10b, on which ring-shaped transparent electrodes 12a and 12b are formed by depositing transparent conductive material such as ITO. The transparent electrodes 12a and 18a have projections 18a and 18b, respectively for connecting the electrodes to a voltage power supply provided in the liquid crystal controller 13. The glass plates 10a and 10b are arranged such that these projections 18a and 18b extend in opposite directions so that only the ring-shaped portions of electrodes are imposed with each other viewed in a direction of an optical axis. In the present embodiment, inner and outer radii r1 and r2 of respective electrodes 12a and 12b are set to 0.3R and 0.4R, respectively. As explained above, the phase ring 4 is provided at a position of the imaging optical system 3 which is conjugate with the ring slit 2 provided at the pupil of the illuminating optical system 1 with respect to the specimen plane.

The voltage applied across the liquid crystal 11 via the electrodes 12a and 12b is controlled by operating an adjusting member provided in the liquid crystal controller 13. In the present embodiment, when the dark contrast image is to be inspected, the applied voltage is set to such a value that there can be obtained a phase difference of $+\pi/2$, and when the bright contrast image is required, the applied voltage is set to a value at which a phase difference of $-\pi/2$ is obtained. In this manner, it is possible to observe the dark contrast image and bright contrast image selectively merely by changing the applied voltage. It should be noted that the desired voltage values may be previously set in the liquid crystal controller 13. To this end, coherent light emitted by a laser light source is projected onto the specimen 5 while the voltage applied across the liquid crystal 11 is changed, and an intensity of interference between a laser beam transmitted through the transparent electrodes 12a and 12b and a laser beam transmitted through a remaining portion is measured. In this manner, it is possible to derive a relationship between the applied voltage and the phase difference.

As stated above, in the present embodiment, the voltage is set to the values at which the phase differences of $\pm\pi/2$ can be attained. Therefore, the dark contrast image and bright contrast image can be inspected at will under the same condition.

It should be noted that when the applied voltage is set to such a value that a phase difference of $\pi/6$ is obtained, it is possible to realize a high resolution optical system as disclosed in Japanese Patent Application Publication No. 3-81129. Then, it is possible to attain three observation modes, i.e. the dark contrast mode, bright contrast mode and high resolution mode.

FIG. 10 depicts another embodiment of the phase ring 4. In the present embodiment, an absorption film 12c is applied on a front surface of the glass plate 10a. The absorption film 12c has the same ring shape as that of the transparent electrodes 12a and 12b and has the same inner and outer radii r1 and r2. Absorbance of this film 12c is about 10 to 15%. When the absorption film 12c is provided in the phase ring 4, in addition to the above mentioned dark contrast mode and bright contrast mode, there is obtained a high resolution mode as described in Japanese Patent Application Laid-open Publication Kokai Sho 56-12615. In this high resolution mode, the voltage is not applied across the liquid crystal 11 so that a phase difference is set to zero. Then, an intensity of a zero order beam can be reduced, and thus a high frequency component of the optical transfer function is enhanced.

Figure 11:
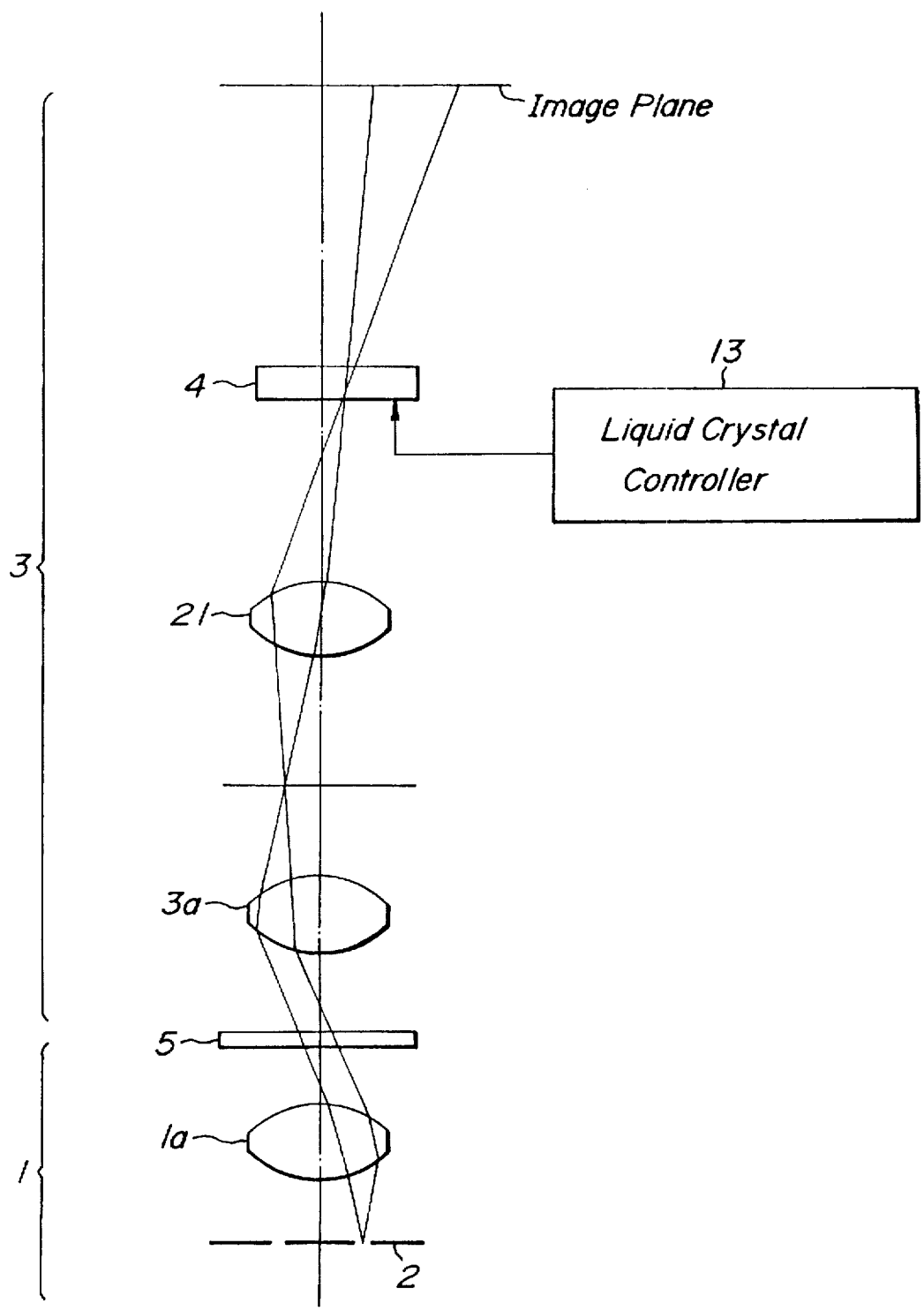
FIG. 11 is a schematic view illustrating another embodiment of the phase contrast microscope according to the invention.

FIG. 11 is a schematic view depicting a seventh embodiment of the phase contrast microscope according to the invention. In the present embodiment, the phase ring 4 illustrated in FIG. 10 is utilized and a pupil relay lens 21 is provided between the objective lens 3a and the phase ring 4. Therefore, in the present embodiment, the phase ring 4 is not arranged at the pupil of the imaging optical system 3, but is arranged at a position on which an image of the pupil of the imaging optical system is formed by the relay lens 21. In a usual phase contrast microscope, the pupil of the imaging optical system 3 is near a rear focal point of the objective lens 3a so that the phase ring might obstruct the objective lens. In the present embodiment, the pupil of the imaging lens system 3 is moved away from the objective lens 3a and the phase ring 4 can be arranged easily without being obstructed by the objective lens and an electric wiring to the transparent electrodes of the phase ring can be realized also easily.

FIGS. 12A, 12B and 12C show another embodiment of the phase ring according to the invention. In the present embodiment, a transparent electrode 12a applied on the glass plate 10a does not have a ring-shape, but has a substantially circular full face shape as illustrated in FIG. 12A. A portion of this transparent electrode 12a corresponding to the projection of the other electrode 12b is cut-off. This phase ring 4 is arranged at a position of the pupil of the imaging optical system including the relay lens 21 as shown in FIG. 11. On a front surface of the glass plate 10a there is provided a ring shaped absorption film 12c like as the embodiment shown in FIG. 10.

In the present embodiment, since the transparent electrode 12a is circular, an alignment of the absorption film with respect to the electrode 12a can be performed very easily. Also in the present embodiment, it is possible to obtain the dark contrast mode, bright contrast mode and high resolution mode by suitably adjusting a voltage applied across the liquid crystal 11 via the transparent electrodes 12a and 12b.

As explained above in detail, according to the first aspect of the invention realized in the embodiments illustrated in FIGS. 1 to 7, the phase plate is constructed to give the phase differences of $\pm\pi/2$ to obtain the dark contrast image and bright contrast image and then a difference between these dark and bright contrast images is derived as an output phase contrast image, and thus the contrast of the phase contrast image can be increased twice as compared with the known phase contrast microscopes without decreasing a resolution. Further, by making the diameter of the phase plate closer to the diameter of the pupil of the imaging optical system, it is possible to mitigate a decrease in contrast, while the resolution can be improved.

In the known phase contrast microscopes, when the light absorption by the phase plate is increased, not only a fundamental frequency, but also higher harmonic frequencies appear, so that the phase contrast image could not be obtained accurately. In the present invention, since the phase plate introduces phase differences having substantially same, but opposite signs and a difference between the dark and bright contrast images is derived as a final phase contrast image, the higher harmonics can be cancelled out and the phase contrast image can be obtained accurately.

Moreover, according to the invention, it is possible to obtain the image signal which is represented by a convolution of the phase distribution of the specimen and transfer function of the optical system, and thus the phase distribution of the specimen can be obtained very precisely by performing the deconvolution.

According to the second aspect of the invention realized in the embodiments illustrated in FIGS. 8 to 12, since the phase difference introduced by the phase ring can be electrically adjusted without causing mechanical errors by changing the voltage applied across the liquid crystal via the transparent electrodes, and therefore the dark contrast image, bright contrast image and/or high resolution image can selectively inspected under the same condition.

What is claimed is:

1. A phase contrast microscope comprising:
   an illumination optical system for illuminating a specimen under inspection;
   an aperture arranged at a pupil of said illumination optical system;
   an imaging optical system for forming an image of the specimen;
   a phase plate arranged near a pupil of said imaging optical system, said pupil of the imaging optical system being arranged at a conjugate position with said aperture with respect to a specimen plane on which said specimen situates;
   an image pick-up means provided at a imaging plane on which an image of the specimen is formed by said imaging optical system for picking-up the image to produce an image signal;
   a storing means for storing said image signal produced by said image pick-up means; and
   a signal processing means for processing the image signal read out of said storing means;
   wherein said phase plate is constructed to give phase differences which have substantially a same amount but have opposite signs, two images at said different phase differences are separately picked-up by said image pick-up means and stored in said storing means, an image of a difference between said two images is derived as a phase contrast image, said phase plate comprises a liquid crystal and substantially transparent electrodes arranged on both sides of said liquid crystal, and a voltage applied to the liquid crystal via the electrodes is changed such that said phase differences having substantially the same amount but having said opposite signs are obtained.

2. A phase contrast microscope according to claim 1, wherein said voltage is set to such values that said phase differences are $+\pi/2$ and $-\pi/2$.

3. A phase contrast microscope according to claim 2, wherein at least one of said transparent electrodes of the phase plate is formed as a ring, and a ratio of a radius r of a center circle of the ring to a radius R of the pupil of the imaging optical system is set to $1>r/R\geq 0.5$.

4. A phase contrast microscope according to claim 3, wherein both of said electrodes of the phase plate are formed as rings.

5. A phase contrast microscope according to claim 3, wherein one of said electrodes of the phase plate is formed as a ring and the other electrode is formed as a full face electrode.

6. A phase contrast microscope according to claim 1, further comprising at least one absorption film.

7. A phase contrast microscope according to claim 6, wherein said absorption film has an absorbance of about 10 to 15%.

8. A phase contrast microscope according to claim 1, wherein:
   said two images at said different phase differences comprise a dark contrast image having an intensity distribution Ia and a bright contrast image having an intensity distribution Ib; and
   said phase contrast image has an intensity distribution Ia–Ib.

9. A phase contrast microscope according to claim 8, wherein:
   said dark contrast image is formed at a first phase difference $+\pi/2$; and
   said bright contrast image is formed at a second phase difference $-\pi/2$.

10. A phase contrast microscope comprising:
    an illumination optical system for illuminating a specimen under inspection;
    an aperture arranged at a pupil of said illumination optical system;
    an imaging optical system for forming an image of the specimen;
    a phase plate arranged near a pupil of said imaging optical system, said pupil of the imaging optical system being arranged at a conjugate position with the aperture with respect to a specimen plane on which said specimen situates, said phase plate including an element which introduces an electrically variable phase difference between a zero order diffracted beam and higher order diffracted beams, and substantially transparent electrodes arranged on opposite sides of said element such that a voltage is applied across the element via the electrodes; and a controlling means for adjusting a value of said voltage applied across said element to set said phase difference to such values that a dark contrast image, a bright contrast image and a high resolution image are selectively observed under a same condition.

11. A phase contrast microscope according to claim 10, wherein said element of the phase plate is formed by a liquid crystal and said controlling means is constructed to adjust the voltage applied across the liquid crystal such that said phase differences are set to $\pm\pi/2$.

12. A phase contrast microscope according to claim 11, wherein said aperture is formed by a ring slit and at least one of said electrodes of the phase plate is formed as a ring.

13. A phase contrast microscope according to claim 12, wherein said controlling means is constructed to adjust the voltage applied across the liquid crystal such that said phase difference is set to $\pi/6$ to observe said high resolution image.

14. A phase contrast microscope according to claim 10, wherein said phase plate further comprises at least one absorption film having a same shape of at least one electrode.

15. A phase contrast microscope according to claim 14, wherein said absorption film has an absorbance of about 10 to 15%.

16. A phase contrast microscope according to claim 10, wherein said controlling means adjusts said value of said voltage applied across said element to set said phase difference to at least three values.

17. A phase contrast microscope comprising:

an illumination optical system for illuminating a specimen under inspection, the specimen being disposed at a specimen plane;

an aperture arranged at a pupil of said illumination optical system;

an imaging optical system for forming an image of the specimen at an imaging plane;

a phase plate arranged near a pupil of said imaging optical system, said pupil of the imaging optical system being arranged at a conjugate position with said aperture with respect to the specimen plane;

an image pick-up means provided at the imaging plane for picking-up the image to produce an image signal;

a storing means for storing said image signal produced by said image pick-up means; and a signal processing means for processing the image signal read out of said storing means;

wherein said phase plate is constructed to give phase differences which have substantially a same amount but have opposite signs, two images at said phase differences comprising a dark contrast image having an intensity distribution Ia and a bright contrast image having an intensity distribution Ib and are separately picked-up by said image pick-up means and stored in said storing means, and an image of a difference between said two images is derived as a phase contrast image having an intensity distribution Ia−Ib.

18. A phase contrast microscope according to claim 17, wherein:

the dark contrast image is formed at a first phase difference $+\pi/2$; and the bright contrast image is formed at a second phase difference $-\pi/2$.

19. A phase contrast microscope comprising:

an illumination optical system for illuminating a specimen under inspection, the specimen being disposed at a specimen plane;

an aperture arranged at a pupil of said illumination optical system;

an imaging optical system for forming an image of the specimen at an imaging plane;

a phase plate arranged near a pupil of said imaging optical system, said pupil of the imaging optical system being arranged at a conjugate position with said aperture with respect to the specimen plane, said phase plate comprising a liquid crystal and substantially transparent electrodes arranged on both sides of the liquid crystal;

an image pick-up means provided at the imaging plane for picking-up the image to produce an image signal;

a storing means for storing said image signal produced by said image pick-up means; and a signal processing means for processing the image signal read out of said storing means;

wherein said phase plate is constructed to give phase differences which have substantially a same amount but have opposite signs, two images at said different phase differences are separately picked-up by said image pick-up means and stored in said storing means, an image of a difference between said two images is derived as a phase contrast image, at least one of said transparent electrodes of the phase plate is formed as a ring and a ratio of a radius r of a center circle of the ring and a radius R of the pupil of the imaging optical system is set to $1>r/R>0.5$.

20. A phase contrast microscope comprising:

an illumination optical system for illuminating a specimen under inspection, the specimen being disposed at a specimen plane;

an aperture arranged at a pupil of said illumination optical system;

an imaging optical system for forming an image of the specimen at an imaging plane;

a phase plate arranged near a pupil of said imaging optical system, said pupil of the imaging optical system being arranged at a conjugate position with said aperture with respect to the specimen plane;

an image pick-up means provided at the imaging plane for picking-up the image to produce an image signal;

a storing means for storing said image signal produced by said image pick-up means;

a signal processing means for processing the image signal read out of said storing means to produce a phase contrast image; and a calculating means for effecting a deconvolution of the phase contrast image obtained by said signal processing means;

wherein said phase plate is constructed to give phase differences which have substantially a same amount but have opposite signs, two images at said different phase differences are separately picked-up by said image pick-up means and stored in said storing means, and an image of a difference between said two images is derived as said phase contrast image.

21. A phase contrast microscope according to claim 20, wherein said calculating means performs a Fourier transform for the phase contrast image derived by said signal processing means, divides a Fourier transformed value thereof by an optical transfer function to derive a quotients, and finally performs a Fourier transform for the quotients.

* * * * *